(No Model.) 2 Sheets—Sheet 1.
S. R. SMITH.
BAND SAW MILL.
No. 442,645. Patented Dec. 16, 1890.
FIG.1.
FIG.2.
FIG.3.
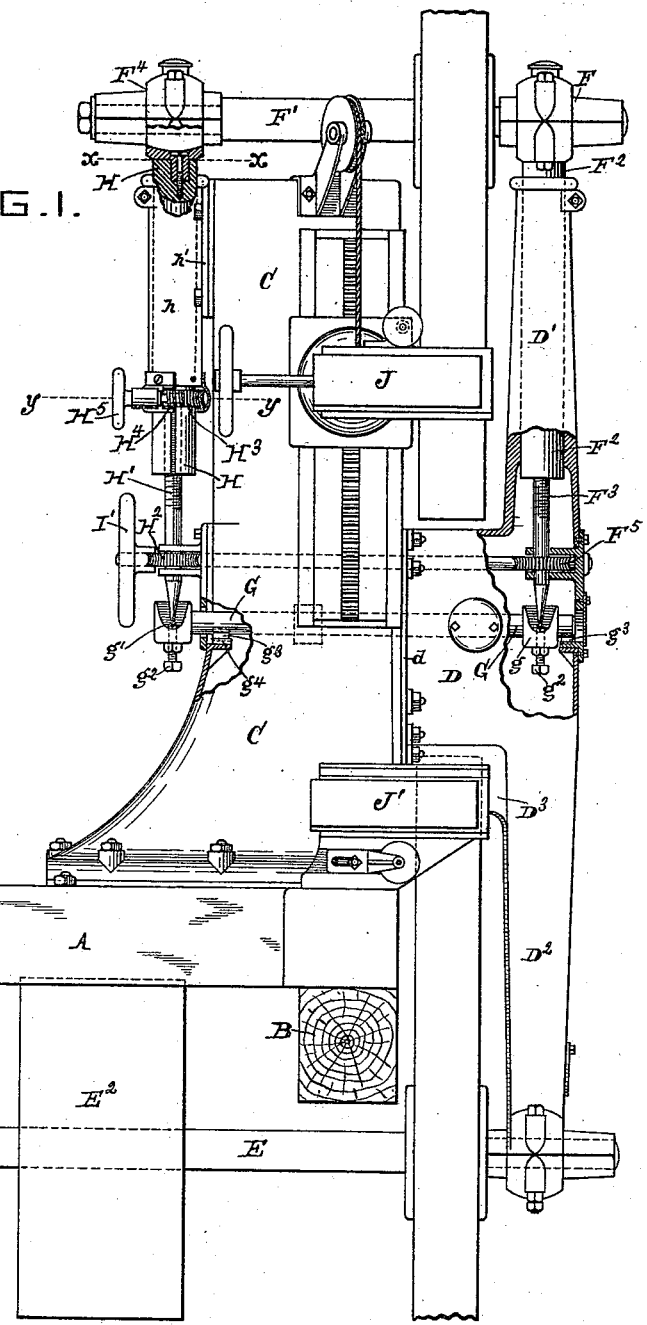
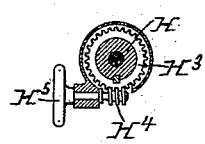
Witnesses
Frank L. Millward
James T. Brava
Inventor
Samuel R. Smith
By his Attorney
Geo. J. Murray

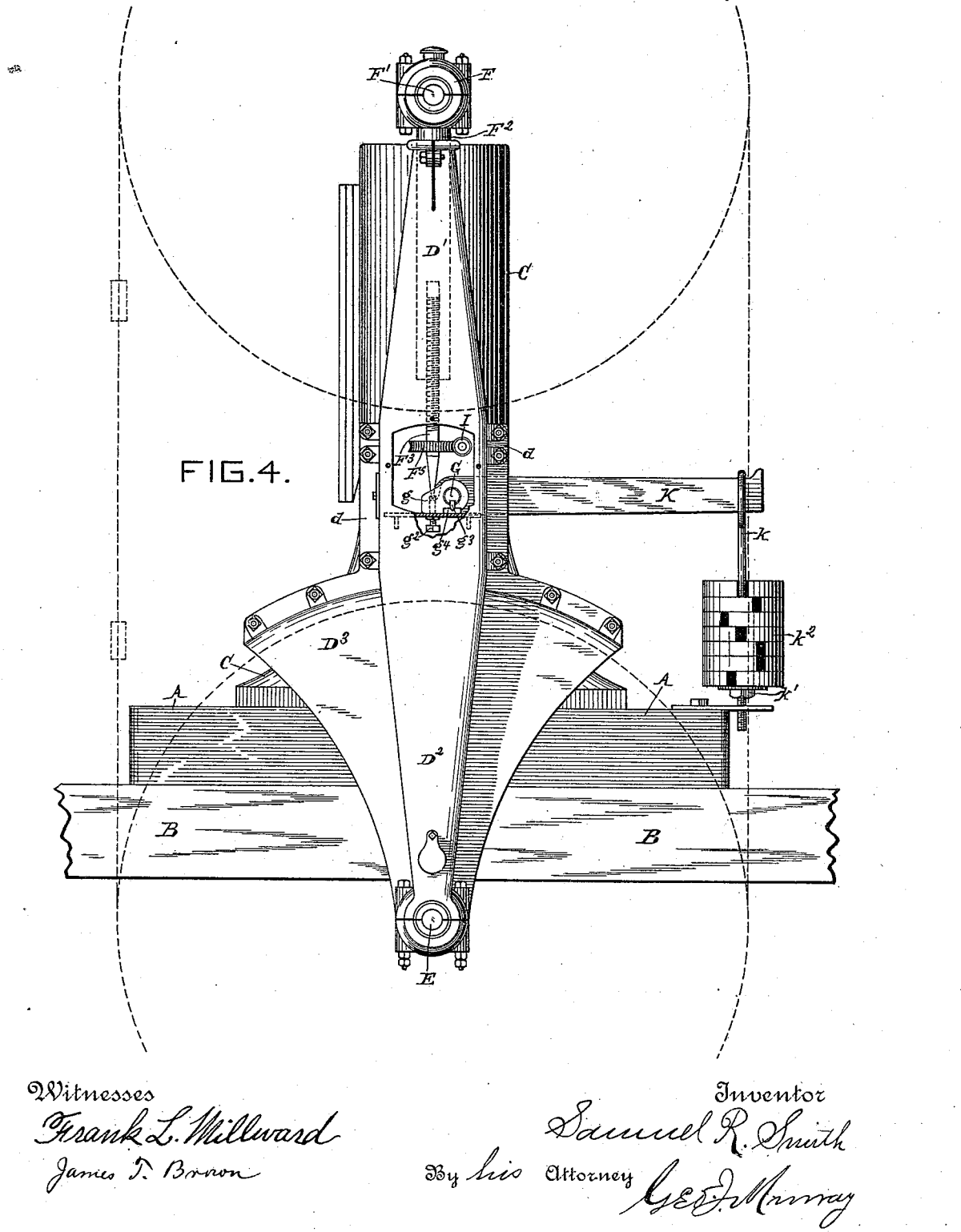

UNITED STATES PATENT OFFICE.

SAMUEL R. SMITH, OF CINCINNATI, OHIO.

BAND-SAW MILL.

SPECIFICATION forming part of Letters Patent No. 442,645, dated December 16, 1890.

Application filed September 24, 1889. Serial No. 324,950. (No model.)

*To all whom it may concern:*

Be it known that I, SAMUEL R. SMITH, a citizen of the United States, and a resident of Cincinnati, in the county of Hamilton and State of Ohio, have invented certain new and useful Improvements in Band-Saw Mills, of which the following is a specification.

The objects of my invention are, first, to so improve the supporting-frame of band-saw mills that the operative parts may be readily applied in position for use and when once adjusted they will be firmly and permanently supported in true alignment; second, to provide means to rapidly adjust the machine to the duty required of it, and, third, to provide means for hanging or supporting the upper band-wheel and its bearings, whereby the saw will be automatically strained to the proper tension and run true, regardless of the duty or load put upon it.

Its object is also to lessen the number of parts usually considered necessary in this class of devices to adapt the mill to be used for all kinds of material.

These objects I accomplish, mainly, by so constructing the frame of the machine that the band-wheels may be kept in true alignment no matter what tension will be brought upon the saw.

In machines of this kind heretofore constructed the supports for the bearings of the upper and lower band-wheels were made separate and independently attached to the supporting-frame. The strain of the saw of course tended to draw the upper and lower band-wheels at an angle to each other, thereby causing the saw to run unevenly or require separate adjustment of the upper band-wheel vertically, as well as what is known as "cross-line adjustment," to make the saw run true after each straining or slackening of the saw tension. To overcome these defects I have provided a single casting, which is firmly secured to the supporting-frame in such manner as to receive the front bearings of both band-wheels. I have also provided a back bearing for the shaft of the upper band-wheel, which is simultaneously adjusted with the front bearing to strain the saw and to automatically keep it strained to the proper tension, but which is also capable of an independent adjustment laterally, vertically, and lengthwise of the shaft by a single movement, each of which adjustments tends to make the saw run in the same direction, so that by a single movement the upper band-wheel is quickly adjusted to the duty required of it without throwing its shaft-bearings out of alignment.

The invention consists, also, in minor details of construction not heretofore enumerated, but which will be fully understood from the following description of the accompanying drawings, and the summary of the invention particularly referred to and pointed out in the claims.

Referring to the drawings, in which like parts are indicated by similar reference-letters wherever they occur throughout the various views, Figure 1 is a view, partly in side elevation and partly in section, of a band-mill embodying my invention. Figs. 2 and 3 are detail views in transverse section, taken, respectively, through lines $x$ $x$ and $y$ $y$ of Fig. 1, illustrating the means by which the back bearing of the upper band-wheel shaft is adjusted. Fig. 4 is a front elevation of the band-mill with some of the parts, as the back guides and bearings for the saw, &c., removed.

The log-carriage, which is no part of my invention, is not shown in any of the views.

Referring to the parts, A is the base-plate, which is a broad heavy casting planed upon top and bottom and securely bolted to bed-timbers B or any suitable foundation.

C is the supporting-frame of the saw, which is preferably a circular upright column terminating in a broad flanged base, which is securely bolted upon the bed-plate A. The column C has cast with it projecting bearing-surfaces, which are planed off to receive the band-wheel supports and back guides for the saw.

The front support of the band-wheel shaft is a single hollow casting consisting of the horizontal portion D, which has outwardly-projecting flanges $d$, which are planed off to joint against the planed seat upon the column C, to which it is securely held by bolts and the vertical columns D' D², which receive and support the boxes or front bearings of the band-wheel shafts. The same casting also comprises the hood or shield D³, which overhangs the lower band-wheel and has an upper segmental flange through which securing-bolts pass to assist in holding the forward casting to the frame C. The lower end of the arm D² is shaped to receive the boxes or bearings for the forward end of the lower band-wheel shaft E. The opposite end of this shaft is supported in a hanger E', secured to the base-plate A and bearing against one of the foundation-timbers B. It is intended that the lower shaft E be permanently fixed and be driven by a pulley E², secured upon shaft E. The upper front bearing F of the upper band-wheel shaft F' is axially secured upon top of a column or trunnion F², which fits snugly into a bore in the upper arm D' of the casting which forms the support for both front bearings of the band-wheels. The trunnion F² is tapped at its lower end to receive a screw-shaft F³, the lower end of which rests in a step in the outer end of an arm $g$, which arm is secured upon a shaft G.

The box F⁴, which journals the rear end of the upper band-wheel shaft F', rests upon and is eccentrically connected to a trunnion H, which is fitted into a tube $h$, which is connected by laterally-projecting flanges $h'$ to the upright column C. The trunnion H, like the trunnion F², is perforated and screw-tapped from below to receive a shaft H', the lower cone end of which rests in the step at the end of an arm $g'$, secured upon the rock-shaft G, precisely the same as the lever-step $g$, which supports the screw-shaft F³. It will be seen, therefore, that in the normal position both the front and rear supports for the bearings of the upper band-wheel shaft rest upon arms $g$ and $g'$, which arms are secured upon the shaft G. The shaft G is supported upon brackets which project inward from the rear of column C and the front of the casting D D' D² by knife-edge bearings. The hardened-steel knife-edge bearings $g^3$ are let into the shaft G, and the steel plates $g^4$, which are secured upon the brackets, have V-shaped grooves, which receive the knife-edge bearings and keep the shaft G, which has no other bearings but its knife-edge supports, in position.

The lever K, which is secured upon the shaft G between its bearings, projects out through an opening in the column C and has a rod $k$ looped or hooked over it near the end. This rod has its lower end screw-threaded to receive a cap-nut $k'$ to support the weights $k^2$, by which the upper band-wheel and its supports are counterpoised. By this arrangement it will be seen that the upper band-wheel shaft is supported upon the arms $g\ g'$ of the rock-shaft G, and that the rock-shaft arms are held in the desired position by the weights suspended from the end of the rock-shaft lever K, so that the tension of the saw is regulated by the weights $k^2$, the number of which may be increased or diminished at will to make the tension very sensitive, and thereby enable the saw to automatically adjust itself to the duty required of it.

In order to strain the saw to the proper tension, which is done by elevating or depressing the trunnions H and F², and to elevate and depress these trunnions simultaneously, I have secured upon the shafts H' and F³ by spline-connections worm-wheels F⁵ and H², arranged between suitable bearings, which will hold the worm-wheels in the same horizontal position, while permitting the shafts F³ and H' to slide through them, and have arranged a worm I to mesh with these worm-wheels, which worm is mounted in bearings in the column C and has secured upon its rear end a hand-wheel I', by which the worm is turned in one or the other direction to rotate the worm-wheels F⁵ and H², and thereby the screw-shafts F³ and H' to elevate or depress the trunnions F² H simultaneously.

It is necessary in machines of this class to provide independent adjustments for the upper band-wheel shaft, or rather for one end of it, so as to keep the saw truly in position upon the upper band-wheel no matter what kind of material is being operated upon. It is found in practice that if the band-wheel shaft is adjusted so that the saw will run perfectly true when cutting soft or green wood it is liable to run if hard, knotty, or uneven-grained wood should be run through the mill. This tendency of the saw to "run" may be remedied by an independent adjustment of one end of the upper band-wheel shaft, either by elevating the rear bearing of the shaft or depressing it by throwing it sidewise in either direction, which is called "cross-line adjustment," or by throwing the upper band-wheel forward or back, which is known to the trade as "end adjustment." Of course either of these adjustments tends to throw the bearings of the shaft more or less out of alignment, and if only one of the three adjustments be employed to make the saw run true upon the upper band-wheel the bearings are considerably disturbed. I have therefore provided a means by which the three adjustments may be attained by a single movement, and each of the three tending to make the saw run in the same direction, so that the front and rear boxes are not perceptibly thrown out of alignment. The means by which this result is accomplished will now be described.

Referring now to Figs. 1 to 3, inclusive, it will be seen, first, that the rear bearing for the shaft F' is eccentrically mounted upon the trunnion H, so that any rotary movement of the trunnion would tend to change the cross-alignment of the shaft F', and would also by the same movement draw the shaft endwise or pull it longitudinally, so that the upper band-wheel would be drawn nearer to or farther from the column C, and would of course change the position of said wheel relatively to the position of the lower band-wheel, which wheel is fixed. It will also be seen that any rotary movement of the trunnion H while the screw H' is held permanent would either elevate or lower the trunnion H and the back bearing F⁴. I have therefore splined upon the trunnion H at its lower end a worm-wheel H³ and have arranged a worm H⁴, journaled in bearings secured to the column $h$ and actuated by a hand-wheel H⁵ to mesh with said worm, whereby a slight movement of the hand-wheel H⁵ will turn the trunnion H and effect the three adjustments above named, each of which tends to throw the saw in the direction desired. For instance, if the saw have a tendency to run to the front of the upper band-wheel a turn to the left of the wheel H⁵ will slightly lower the rear bearing of shaft F', throw it to the side, which tends to make the saw run inward, and at the same throw the upper band-wheel slightly forward, because the rear bearings of the shaft F' are fixed so that the shaft cannot move endwise in them, while the shaft has longitudinal play in its front bearings. The reverse movement of the hand-wheel H⁵ produces, of course, the opposite effect. The screw-shafts F³ and H' are preferably of steel and their lower cone ends tempered or hardened. The adjusting-screws $g^2$ are also of hardened steel and have countersunk depressions forming steps for the cone ends of the shafts F³ and H'. The back saw-guides J J', Fig. 1, are of ordinary construction. The only advantage is in the peculiar arrangement by which they are both fastened upon the supporting frame or column C.

I have shown and described what I believe to be the simplest and best means of embodying my invention; but it is obvious that many mechanical changes may be made without departing from its spirit and scope, and I would hence have it understood that I consider all such mechanical changes as mere modifications of my invention.

I claim—

1. In a band-saw mill, the combination, with the band-wheels and main supporting frame or column, of an integral standard carrying the front bearings of the upper and lower band-wheel shafts, said standard being attached to the front side of said main frame or column between said band-wheels, substantially as hereinbefore set forth.

2. The combination, substantially as specified, of the hollow supporting-column C and the hollow casting D D' D², centrally secured to said column to furnish rigid supports for the front bearings of the upper and lower band-wheel shafts.

3. A support for the front bearings of the band-wheel shafts, having the flanged horizontal portion D, to be secured to the supporting-frame, and the vertical arms D' D², cast in one piece with said central portion, the said part D' being bored to receive the adjustable bearing of the upper band-wheel shaft.

4. The combination of the base-plate A, cast in a single piece, the column C, having a flanged base to be secured to said base A, the front support for the band-wheel shafts, consisting of the casting D D' D², and shield D³, together forming a supporting-frame for band-saw mills, substantially as hereinbefore set forth.

5. In a band-saw mill, the combination of the supporting-frame, the vertically-adjustable bearings for the upper band-wheel shaft, mounted in said frame, the transverse shaft G, mounted on knife-edge bearings in said frame and having arms $g\ g'$ secured upon said shaft to support the bearings of said upper band-wheel shaft, and the weighted lever K, secured upon said shaft between the knife-edge bearings to counterpoise the bearings of the upper band-wheel shaft and provide a sensitive automatic adjustment for the same, whereby the saw is kept at the proper tension, substantially as hereinbefore set forth.

6. The combination, substantially as hereinbefore set forth, of the supporting-frame, the transverse shaft G, having knife-edge bearings $g^3$ secured in it, the supporting-plates $g^4$, resting on brackets in said frame, the arms $g\ g'$, having steps at their outer ends, the hardened-steel adjustment-screws $g^2$, passing through said steps, the vertically-adjustable bearings for the upper band-wheel shaft, resting upon said screws, the lever K, secured upon said shaft and projecting through the frame, the rod $k$ upon the outer end of said lever K, the cap-nut $k'$ upon said rod, and the removable weights $k^2$, for the purpose specified.

7. In a band-saw mill, the combination of a vertically and axially adjustable support for the rear bearing of the upper band-wheel shaft, the said bearing eccentrically pivoted upon top of said support, and means, such as shown, to rotate and at the same time either elevate or lower said bearing, substantially as and for the purposes set forth.

8. The combination, in a band-saw mill, of the supporting-column C, the tubular bearing $h$, secured to it, the shaft-bearing support H, fitted to slide and turn in said bearing, the supporting-shaft H', united by screw-threaded connection with said trunnion, the upper rear bearings F⁴ for the band-wheel shaft, eccentrically secured upon the top of said shaft-bearing support, and means, such as shown, to rotate said shaft-bearing support for the purpose of adjusting the rear bearing of the band-wheel shaft independent of the front bearing, substantially as shown and described.

9. The combination, substantially as hereinbefore set forth, of the vertically-adjustable supports for the bearings of the upper band-wheel shaft, means, such as shown, to simultaneously adjust said supports to elevate or lower said shaft, the rear bearings F⁴, pivoted eccentrically upon said rear support, the worm-wheel H³, splined upon the rear support, the worm H⁴, meshing with said worm-wheel, and the hand-wheel H⁵ to actuate said worm, whereby the rear support is rotated within its bearing, for the purpose set forth.

10. In a band-saw mill, the combination of the column C, brackets projecting from said column, a rock-shaft having knife-edge bearings resting upon said brackets, a weighted lever, and two arms $g$ $g'$, secured upon said rock-shaft, with the band-wheel shaft and its boxes, and rods supporting the boxes, said rods resting upon the arms $g$ $g'$, substantially as shown and described.

SAMUEL R. SMITH.

Witnesses:
FRANK DAVIS,
GEO. J. MURRAY.